United States Patent [19]

Laurent et al.

[11] Patent Number: 4,872,421

[45] Date of Patent: * Oct. 10, 1989

[54] METHOD OF ENHANCING MATING IN POULTRY

[75] Inventors: Sebatian M. Laurent, Greenwall Springs; Robert N. Sanders, Baton Rouge, both of La.

[73] Assignee: Ethyl Corporation, Richmond, Va.

[*] Notice: The portion of the term of this patent subsequent to Sep. 9, 2003 has been disclaimed.

[21] Appl. No.: 934,458

[22] Filed: Nov. 24, 1986

Related U.S. Application Data

[60] Continuation-in-part of Ser. No. 846,188, Mar. 31, 1986, abandoned, which is a continuation of Ser. No. 741,572, Jun. 5, 1985, abandoned, which is a division of Ser. No. 475,370, Mar. 14, 1983, Pat. No. 4,556,564.

[51] Int. Cl.$^4$ ............................................... A23K 1/00
[52] U.S. Cl. .......................................... 119/1; 426/2
[58] Field of Search ................ 426/2, 72, 73, 74, 623, 426/630, 807, 298; 119/1

[56] References Cited

U.S. PATENT DOCUMENTS

| | | | |
|---|---|---|---|
| 3,776,188 | 12/1973 | Komakine | 426/2 X |
| 3,836,676 | 9/1974 | Komakine | 426/74 |
| 4,515,780 | 5/1985 | Laurent et al. | 424/154 |
| 4,537,771 | 8/1985 | Greb et al. | 424/154 |
| 4,556,564 | 12/1985 | Laurent et al. | 426/2 |
| 4,610,883 | 9/1986 | Laurent et al. | 424/154 |

OTHER PUBLICATIONS

Chung et al., *Nongsa Sihom Youngu Pogo*, 1978, 20 (livestock), pp. 77–83.
Mumpton et al., The Application of Natural Zeolites in Animal Science and Aquaculture, *Journal of Animal Science*, 45, No. 5, 1188–1203 (1977).
Willis et al., *Poultry Science* 61, 438–442 (1982).
Vest et al., *Zeo-Agriculture* '82.
Nakaue et al., *Poultry Science*, 60, 944–949 (1981).
Great Lakes Science Advisory Board of the Internat'l Joint Commission on the Health Implications of Non–NTA Deterg. Bldrs., 10/80, Rev. 3/81.
Gloxhuber et al., *Chemical Toxicology* 21:2, pp. 209–220 (1983).
Nolen et al., *Food & Cosmetic Toxicology*, 21 (5), p. 697 (1983).
Cook et al., Zeolite A Hydrolysis & Degradation, *Environ Sci. Technol.* 16(6), pp. 344–350 (1982).
Benke et al., *Food & Cosmetic Toxicology*, 17, pp. 123–127 (1979).
Anon, Tentative Evaluation of the Health Aspects of Certain Silicates as Food Ingredients (1977).
Carlisle, *Nutrition Reviews* 40(7), pp. 193–198 (1982).
Carlisle, Chap. 4, Silicon & Siliceous Structures in *Biol. Systmes*, Simpson, T. L., ed. B. E. Springer Verlag, NY (1981) pp. 69–94.
Berlyne et al., *Nephron*, 43, pp. 5–9, (1986).
Charnot et al., *Annales D'Endocronologie*, 32, pp. 397–402 (1971).
Charnot et al., Silicon Encodrine Bal. & Min. Metabolism, in Biochem of Silicon & Related Prod.'s, Bendz et al., Ed. Plenum Press, NY pp. 269–280 (1979).
Merkley et al., *Poultry Science* 62, pp. 798–804 (1983).
Reagan, Luther M., Effects of Adding Zeolites to the Diets of Broiler Cockerels; Thesis; Colo. State Univ., 4/25/84.
Edwards, Poultry Science, vol. 65, Supp. No. 1 (1986).
Roland et al., *Poultry Science* 64, 1177–1187 (1985).
Miles et al., *Nutrition Reports International* 34, No. 6, 1097 (Dec., 1986).
Ingram et al., Influence of ETHACAL ®Feed Component on Production Parameters of White Leghorn Hens During High Temp.'s.

Primary Examiner—Robert P. Swiatek

[57] ABSTRACT

A method of increasing the mating aggressiveness of poultry males by adding an effective amount of zeolite A up to about 4.0 weight percent of the feed, to the feed of the poultry males, and feeding the poultry males the feed containing zeolite A.

22 Claims, No Drawings

METHOD OF ENHANCING MATING IN POULTRY

CROSS-REFERENCE TO RELATED APPLICATIONS

This Application is a Continuation-in-Part of Application Ser. No. 846,188 filed on Mar. 31, 1986, and now abandoned, which is a Continuation of application Ser. No. 741,572 filed on June 5, 1985, now abandoned, which in turn is a Division of application Ser. No. 475,370 filed on Mar. 14, 1983, now U.S. Pat. No. 4,556,564.

BACKGROUND OF THE INVENTION

The present invention is in the general field of poultry farming and relates particularly to the feeding of male poultry, particularly breeding cocks or roosters, as they are commonly named.

The demand for poultry, especially in fast foods and other foods has expanded considerably over the last decade. The poultry industry has grown from a home industry to a large scale manufacturing industry in which thousands of birds are produced daily at single farms or poultry farming installations. Some birds are produced for eating and some birds are produced for breeding or egg producing. One problem with such large scale production is that male birds or cocks cannot adequately accommodate all the hens or female birds during their mating activities. As with most animals, the cocks tend to quite before mating of all female birds has taken place, thus requiring the larger numbers of cocks to obtain sufficient mating.

In general, the economically beneficial productive life of broiler breeders is relatively short, about nine months for females and six months for males. Even a small increase in economic longevity provides a high dollar value to this large food producing industry. A one month extension of the lay cycle for females could save the industry over thirty million dollars annually. A one month extension for males could be worth an additional ten million dollars.

The poultry broiler industry in the United States of America produces approximately five (5) billion broilers. In order to produce such a large number of chicks, presently, about 6.1 billion eggs must be set in incubators, since 18 to 20 percent of the eggs set never hatch. One of the principal reasons for poor hatching percentages is inadequate fertility of male breeders. Even a five (5) percent improvement in the percentage of eggs hatched projects to a fifty million dollar annual benefit to the industry.

Larger numbers of cocks unnecessarily complicate the social order (pecking order) of the birds in the breeding house, and consequently costs are undesirably increased.

It is therfore an important object of the present invention to provide a means for increasing the drive or aggressiveness of male birds, cocks or roosters, thereby increasing poultry production and reducing costs.

A principal object of the invention is to improve the effectiveness of male birds in their mating activities.

Various types of zeolites, mainly naturally occurring zeolites or those found in nature, have been fed to a variety of animals, in various amounts, including chickens, for a variety of reasons and with various results, mostly unfavorable.

In addition to increasing eggshell strength in laying hens as described in our U.S. Pat. No. 4,556,564, improving feed utilization efficiency in poultry and larger egg size as described in our U.S. Pat. No. 4,610,882, decreasing the mortality rate of poultry as described in our U.S. Pat. No. 4, 610,883, and increasing the bone strength of animlas, including humans, as set forth in our copending U.S. application Ser. No. 801,596, as a result of our continuing studies it has been discovered that the regular feeding of small amounts of zeolite A to poultry produces the following positive results:
1. Calmer birds, reduced activity (layers)
2. Extended lay cycle duration (layers and broiler breeders)
3. Reduced carcass condemnation (broilers)
4. Improved feathering (broilers)

The advantages of larger eggs, extended lay cycles and reducd condemnations are self-evident. Calmer birds produce more, less deformed eggs and lay with greater regularity. Stress in layers, as in most animals, is a highly negative factor. Improved feathering correlates with healthier and stronger birds.

More recently, our studies have discovered the following positive results:
1. Increased male aggressiveness in breeding activity
2. Improved lean/fat ratio in the edible carcass
3. Improved resistance to heat stress, a multi-faceted benefit It is well known that more active roosters impregnate more hens and result in more, i.e. greater numbers of fertile eggs. Male birds regularly fed zeolite A are more aggressive than birds regularly fed a similar feed without zeolite A.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

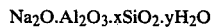

$$Na_2O.Al_2O_3.xSiO_2.yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85+0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accomodate water molecules varies.

The average value for "y" for zeolite A is 5.1. The formula for zeolite A may be written as follows:

$$1.0 \pm 0.2\ Na_2O.Al_2O_3.1.85 \pm 0.5\ SiO_2.yH_2O$$

In the formula, "y" may be any value up to 6.

An ideal zeolite A has the following formula:

$$(NaAlSiO_4)_{12}.27H_2O$$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the K$\alpha$ doublet of copper and a Geiger counter spectrometer or suitable radiation detector with a strip chart pen recorder is used. The peak heights, I, and the positions as a function of $2\theta$ where $\theta$ is the Bragg angle, are read from a spectrometer chart or accumulated in computer memory. From these, the relative intensities, $100\ I/I_o$, where $I_o$ is the intensity of the strongest line or peak and d the interplanar spacing in angstroms corresponding to the recorded lines are calculated.

X-ray powder diffraction data for a sodium zeolite A are given in Table I.

TABLE I

| X-RAY DIFFRACTION PATTERN FOR ZEOLITE A | | |
|---|---|---|
| $h^2 + k^2 + l^2$ | d (Å) | $\frac{100\ I}{I_o}$ |
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |

TABLE I-continued

| X-RAY DIFFRACTION PATTERN FOR ZEOLITE A | | |
|---|---|---|
| $h^2 + k^2 + l^2$ | d (Å) | $\frac{100\ I}{I_o}$ |
| 57 | 1.632 | 4 |
| 59 | 1.604 | 6 |

The more significant d values for zeolite A are given in Table II.

TABLE II

| MOST SIGNIFICANT d VALUES FOR ZEOLITE A |
|---|
| d Value of Reflection in Å |
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skiled in the art of X-ray crystallography or diffraction can cause some variations in the intensities and positions of the lines. These changes, even in those few instancs where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio fo Al/Si=2/3=0.67, or greater,produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum silicate water mixture having an $SiO_2$:$Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasnu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188-1203.

U.S. Pat. No. 3,836,676 issued to Chukei Komakine in 1974 discloses the use of zeolites as adsorbent moisture of ferrous sulfate crystals in an odorless chicken feed comprising such crystals and chicken droppings. The results were said to be no less than those in the case where chickens were raised with ordinary feed.

Canadian Patent 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

An article by C. U. Chung et al from Nongsa Sihom Youngu Pogo 1978, 20 (Livestock) pp. 77-83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference was observed when 1.5, 3, and 4.5 percent zeolite was added to chicken layer diets.

A study by H. S. Nadaue of feeding White Leghorn Layers clinoptilolite, reported in 1981 Poultry Science 60:944-949, disclosed no significant differences in eggshell strength between hens receiving the zeolite in their diet and hens not receiving the zeolite in thier diet.

In a recent study at the University of Georgia, both broilers and layers were fed small amounts (about 2%) of clinoptilolite, a naturally occurring zeolite from Tilden, Tex. The eggshells from the hens receiving zeolite were slightly more flexible as measured by deformation, slightly less strong as measured by Instron breaking strength, and had a slightly lower specific gravity. The differences in eggshell quality were very small. This type of zeolite was ineffective in producing a stronger eggshell. An article written by Larry Vest and John Shutze entitled "The Influence of Feeding Zeolites to Poultry Under Field Conditions" summarizing the studies was presented at Zeo-Agricultrue '82.

It is an important object of the present invention to increase the aggressiveness of male poultry by feeding a feed to the male poultry which contains a small effective amount of zeolite A.

It is another object of the invention to provide an increase in fertile eggs by feeding the poultry a feed containing a small amount of zeolite A sufficient to extend the fertile egg producing life of the poultry.

Another object of the invention is to provide an improved process for increasing the effective egg producing period of laying poultry wherein an effective amount of zeolite A is added to the diet of the laying poultry.

Still another object of the invention is to cost effectively decrease the mortality rate of laying poultry.

Other objects and advantages of the invention will be more fully understood from a reading of the description and claims hereinafter.

SUMMARY OF THE INVENTION

The present invention relates to a method of improving the mating aggressiveness of male poultry, cocks or roosters wherein a small amount of zeolite, especially zeolite A is added to the feed of the male poultry.

DESCRIPTION OF THE PREFERRED EMBODIMENT

It has been discovered that the addition of a relatively small amount of zeolite A to a regular or standard feed for male poultry, cocks or roosters, especially chickens and more especially broiler breeders, effectively increases their aggressiveness in mating, thereby substantially increasing the numbers of fertile eggs. Zeolite A is added in amounts of from about 0.25 percent to about 4.00 percent of weight of the total feed fed to the roosters and more preferably in amounts of 0.75 to 3.5 weight percent.

A typical feed preparation for large scale poultry operations could comprise the following by weight percent:

| | |
|---|---|
| Corn | 50-75 |
| Soybean Meal | 10-30 |
| Calcium Carbonate | 0.4-10 |
| Phosphates | 1-4 |
| Vitamins, Amino Acids | 0.1-1.0 |
| Salt and Other Minerals | |

Zeolite A is added to such fed formulation in small amounts by weight percent of up to about four. Greater amounts may be used, but may deprive the poultry of the desired amount of nutrients. Greater amounts are also likely to be cost ineffective. A particularly preferred amount of zeolite A is from about one-half to about two percent by weight of the total feed formulation. A most preferred amount of zeolite A is about 0.50 to about 1.50 weight percent of the total feed formulation.

Using ETHACAL® feed component, a commercially available sodium zeolite A, a number of tests were conducted to determine the effect of zeolites on male aggressiveness.

| Diet | Calcium (Wt. %) | Zeolite A (Wt. %) | Salt (Wt. %) |
|---|---|---|---|
| 1 | 2.50 | 0 | 0.21 |
| 2 | 2.50 | 0.5 | 0.15 |
| 3 | 2.50 | 1.0 | 0.09 |

The salt in the diets was adjusted to equal sodium levels to compenste for the sodium contained in the zeolite A.

The diet fed to the poultry consisted principally of corn supplemented with a soybean meal (SBM) and limestone. It also contained smaller amounts of alfalfa meal, dicalcium phosphate (DiCalP), a synthetic amino acid (DL-methionine), salt, a commercial vitamin and mineral supplement for layers (Micro-Mix). Each diet assured that the broiler breeders received all of the required nutrients and minerals recommended by the National Research Council of the U.S. Subcommittee on Poultry Nutrition.

Diets contained normal amounts of calories per pound, protein, sulfur amino acids, calcium and phosphorus.

Data with regard to male aggressiveness was acquired by observing the behavior of the males as the farm worker entered each pen. It is well known that male roosters will defend their territory (the pen of hens) by attacking any intruders into the pen, even human workers. It is also well known that the more aggressive males have generally higher sperm counts that the more docile males and will inseminate more females and fertilize more eggs. Over a two week period the workers recorded the pen numbers in which they were attakhed by the males. The pens were randomly distributed in a large poultry house. The following table gives the average results for the 2 week period.

| Percent Ethacal ® Feed Component in Diet | Percent of Aggressive Attacks |
| --- | --- |
| 0 | 0 |
| 0.5 | 33 |
| 1.0 | 60 |

The data clearly show a linear response with zeolite concentration in the diet.

The productive high fertility life of a broiler male is about 6 months. With zeolite in their diets it is expected that this fertility gain extends the useful life an additional month or two, a gain of as much as 33 percent.

The term poultry includes all domestic fowl, namely chickens, turkeys, ducks, geese, and the like.

Corn is the principal diet for most poultry. A feed formulaton comprising by weight percent the following is desirable:

| | Weight Percent |
| --- | --- |
| corn | 50–75 |
| soybean meal | 10–30 |
| calcium carbonate | 1–10 |
| zeolite A | 0.25–4.0 |

Calcium carbonate is usually in the form of natural limestone ground to a suitable particle size, but sometimes oyster shells which have also been suitably ground are used.

It can be appreciated that a wide variety of nutrients or foods may be included in the diets of poultry. In a contolled environment, the poultry are only exposed to desired foods or food products. A typical poultry ration composition contains the following:

| | Weight Percent |
| --- | --- |
| crude protein - not less than | 15.0 |
| crude fat - not less than | 2.5 |
| crude fiber - not more than | 7.0 |
| calcium (as Ca) - not less than | 0.2 |
| calcium (as Ca) - not more than | 4.1 |
| phosphorus (P) - not less than | 0.4 |
| iodine (I) - not less than | 0.0001 |
| salt (NaCl) - not less than | 0.1 |
| salt (NaCl) - not more than | 0.4 |

The foregoing composition is obtained from or includes the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products, Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers' yeast. All of these are protein sources.

Roughage or fiber. Includes dehydrated alfalfa, alfalfa hay, alfalfa leaf meal and pasture grasses. These are all fiber sources.

Animal and fish by-products. Includes blood meal, blood flour, dried buttermilk, dried whey, dried casein, fish meal, dried fish solubles, liver meal, meat meal, meat meal tankage, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL-methionine, choline chloride, folic acid, dicalcium phosphate, magnesium sulfonate, potassium sulfate, calcium carbonate (limestone, oyster shells), salt, sodium selenite, manganous oxide, calcium iodate, copper oxide, zinc oxide and D activated animal sterol.

Molasses and animal fats are added to improve palatability and to increase or balance the energy levels.

Preservatives are also added such as, Ethoxyquin ® and sodium sulfite.

In general, a fed composition for poultry should preferably contain by weight percent the following:

| | Weight Percent |
| --- | --- |
| crude protein - at least about | 14 |
| crude fat - at least about | 2 |
| crude fiber - not more than about | 7 |
| calcium - about | 0.1 to 4.1 |
| phosphorus - at least about | 0.2 |
| iodine - at least | 0.0001 |
| sodium - about | 0.1 to 0.4 |
| chlorine - about | 0.1 to 0.5 |
| zeolite A - about | 0.25 to 4.0 |

The foregoing disclosure and description of the invention is illustrative and explanatory thereof and various changes in the illustrated process may be made within the scope of the appended claims without departing from the spirit of the invention.

What is claimed is:

1. A method of increasing the mating aggressiveness of poultry males in the presence of poultry females which comprises:
   (a) including in the feed of the poultry males an effective amount of zeolite A up to about four weight percent of the feed sufficient to increase the mating aggressiveness of the poultry males over that of non-zeolite fed poultry males;
   (b) feeding such feed to the poultry males over a sufficient period of time such that the mating aggressiveness of said poultry males is increased; and
   (c) causing or allowing such poultry males to be in the presence of poultry females.

2. The method of claim 1, wherein the amount of zeolite A added to the feed of the poultry males is from about 0.25 percent to 3.5 weight percent.

3. The amount of claim 1, wherein said zeolite A in said feed of the poultry males is about 0.75 weight percent.

4. The method of claim 1, wherein the amount of zeolite A added to the fed of the poultry males is about 1.5 weight percent.

5. The method of claim 1, wherein the amount of zeolite A added to the feed of the poultry males is about 0.75 to about 1.5 weight percent.

6. The method of claim 1, wherein the feed fed to the poultry males comprises principally corn, and about 0.25 to about 3.50 percent by weight of zeolite A.

7. The method of claim 1, wherein the feed fed to the poultry males comprises by weight percent, 50-75 percent corn, 10-30 percent soybean meal and 0.4-10 percent calcium carbonate, and about 0.25 percent to about 4.0 percent by weight of zeolite A.

8. The method of claim 7, wherein the feed fed to the poultry males contains zeolite A in an amount of about 0.75 to about 1.5 weight percent.

9. The method of claim 1, wherein the feed fed to the poultry males comprises proteins, fats, carbohydrates, minerals and vitamins and about 0.25 to about 4.0 percent by weight of zeolite A.

10. The method of claim 21, wherein the feed fed to the poultry males comprises by weight percent the following:

| | |
|---|---|
| crude protein | at least 14 |
| crude fat | at least 2.5 |
| crude fiber | not more than 7.0 |
| calcium | about 0.2 to 3.0 |
| phosphorus | at least 0.4 |
| iodine | at least 0.0001 |
| sodium | about 0.1 to 0.3 |
| chloride | about 0.1 to 0.3 |
| zeolite A | about 0.25 to 4.00 |

11. The method of claim 1, wherein the poultry males are chickens.

12. The method of claim 1, wherein the poultry males are turkeys.

13. The method of claim 1, wherein the poultry males are selected from the group consisting of turkeys, geese and ducks.

14. A method of increasing the mating aggressiveness of poultry males in the presence of poultry females wherein an effective amount of zeolite Z sufficient to increase the mating aggressiveness of the poultry males over that of non-zeolite fed poultry males up to about four weight percent of the feed is added to the feed of the poultry males and the feed is fed to the poultry males, and wherein the feed fed to the poultry males comprises by weight percent the following:

| | |
|---|---|
| crude protein | at least 12 |
| crude fat | at least 2 |
| crude fiber | not more than 7.0 |
| calcium | about 0.2 to 4.1 |
| phosphorus | at least 0.4 |
| iodine | at least 0.0001 |
| sodium | about 0.1 to 0.4 |
| chloride | about 0.1 to 0.5 |
| zeolite A | about 0.25 to 4.0 |

15. A method of improving the mating aggressiveness of male chickens in the presence of female chickens which comprises:
   (a) including in the feed of at least one male chicken an effective amount of zeolite A up to about four weight percent of the feed sufficient to increase the mating aggressiveness of the male chicken over that of a non-zeolite fed male chicken;
   (b) feeding such feed to the male chicken over a sufficient period of time such that the mating aggressiveness of said male chicken is increased; and
   (c) exposing such male chicken to a population of female chickens such that mating occurs.

16. The method of claim 15, wherein the amount of zeolite A added to the feed of the male chickens is about one weight percent of the weight of the feed.

17. The method of claim 15, wherein the zeolite A fed to the male chickens is in an amount of from about 0.50 to about 3.5 weight percent of the feed.

18. The method of claim 15, wherein the zeolite A fed to the male chickens is in an amount of from about 0.75 percent to about 1.50 percent by weight of the feed.

19. A feed composition for male poultry characterized by having the property of increasing the mating aggressiveness of male poultry when used as the diet for such male poultry, said feed composition containing an amount of zeolite A sufficient to increase the mating aggressiveness of said male poultry when fed thereto on a substantially continuous basis, said amount being from about 0.25 to about 4.00 weight percent of said feed composition, said mating aggressiveness being manifested when said so-fed male poultry is/are exposed to one or more populations of female poultry of the same species.

20. A feed composition of claim 19 consisting principally of corn supplemented with soy bean meal and limestone.

21. A method of increasing the mating aggressiveness of poultry males over that of non-zeolite fed poultry males, said method comprising feeding to said males a poultry feed comprising by weight percent the following:

| | |
|---|---|
| crude protein | at least 12 |
| crude fat | at least 2 |
| crude fiber | not more than 7.0 |
| calcium | about 0.2 to 4.1 |
| phosphorus | at least 0.4 |
| iodine | at least 0.0001 |
| sodium | about 0.1 to 0.4 |
| chloride | about 0.1 to 0.5 |
| zeolite A | about 0.25 to 4.0 | thereby increasing their aggressiveness in mating.

22. A method of increasing the mating aggressiveness of poultry males in the presence of poultry females, said method comprising feeding an amount of zeolite A to said males in an amount sufficient to increase their mating aggressiveness, and therefter placing said males in the presence of said females.

* * * * *

UNITED STATES PATENT AND TRADEMARK OFFICE
CERTIFICATE OF CORRECTION

PATENT NO. : 4,872,421

DATED : October 10, 1989

INVENTOR(S) : Sebastian M. Laurent et al

It is certified that error appears in the above-identified patent and that said Letters Patent is hereby corrected as shown below:

Column 9, line 21, reads "to the fed" and should read -- to the feed --.

Signed and Sealed this

First Day of January, 1991

Attest:

HARRY F. MANBECK, JR.

Attesting Officer

Commissioner of Patents and Trademarks